United States Patent [19]

Hirose et al.

[11] Patent Number: 5,731,373
[45] Date of Patent: Mar. 24, 1998

[54] SLIDE BEARING SLIDE BEARING ASSEMBLY AND SMALL MOTOR

[75] Inventors: Kazuo Hirose, Yokkaichi; Takashi Minami, Kuwana, both of Japan

[73] Assignee: NTN Corporation, Osaka, Japan

[21] Appl. No.: 578,431

[22] Filed: Dec. 26, 1995

[30] Foreign Application Priority Data

Dec. 26, 1994 [JP] Japan .................................. 6-322995

[51] Int. Cl.$^6$ ...................................................... C08K 3/00
[52] U.S. Cl. ........................ 524/447; 524/425; 524/427; 524/449; 524/451; 524/494; 524/495; 524/496
[58] Field of Search ................................. 524/447, 449, 524/495, 496, 451, 425, 427, 494

[56] References Cited

U.S. PATENT DOCUMENTS 4,877,813 10/1989 Jiano et al. ............................... 525/146
5,415,791 5/1995 Chou et al. ................................ 252/12

*Primary Examiner*—Edward J. Cain
*Attorney, Agent, or Firm*—Wenderoth, Lind & Ponack

[57] ABSTRACT

A slide bearing, a slide bearing assembly and a small motor with a slide bearing assembly which are comparable to or even better than conventional sintered oil-impregnated bearings in mechanical strength, stability of friction coefficient, and which are small and lightweight. The bearing assembly includes a housing having a circular hole and a through hole for supporting a rotary shaft and integrally formed from a resin composition comprising 20–40% by weight of a synthetic resin such as polyphenylene sulfide, 20–60% by weight of an inorganic filler such as mica, 10–30% by weight of a fibrous reinforcing material such as carbon fiber, 3–7% by weight of a lubricating oil such as fatty acid ester oil, and 1–5% by weight of an oil retaining material such as talc. There is also provided a slide bearing formed from the same resin composition as above. There is also provided a small motor having the above slide bearing assembly, a stator carried by the housing of the bearing assembly, and a rotor having a rotary shaft supported by the slide bearing of the bearing assembly.

17 Claims, 2 Drawing Sheets

SLIDE BEARING SLIDE BEARING ASSEMBLY AND SMALL MOTOR

BACKGROUND OF THE INVENTION

The present invention relates to a slide bearing, a slide bearing assembly and a small motor with such bearing or bearing assembly which are especially suited for use as a bearing for supporting a rotary shaft of a recorder/player such as a video tape recorder (VTR) for running a magnetic recording tape.

Sintered oil-impregnated bearings or slide bearings made of a resin having high sliding characteristics are ordinarily used in a slide bearing assembly for supporting a rotary shaft that has to be rotated with extremely high precision such as a rotary shaft for feeding sound/picture recording magnetic tapes.

FIG. 4 shows a conventional slide bearing assembly for use with a VTR capstan motor. It has upper and lower sintered oil-impregnated bearings 12 made of a sintered metal impregnated with a lubricating oil for supporting a rotary shaft 3 of a rotor 1 of the motor, which comprises the rotor 1 and a stator 2. A pivot bearing 13 of a resin material supports the top free end of the rotary shaft 3 to check whirling. The bearings 12 and 13 are fitted in a housing 14 formed from die-cast aluminum, a material having a high mechanical strength.

A pair of seal rings 15 are fitted on the rotary shaft 3 at its upper and lower portions to prevent the lubricating oil in the bearings 12 from oozing out and reaching the intermediate portion of the rotary shaft 3. Thus, these seal rings 15 keep lubricating oil off a rubber roller 9 and a magnetic tape 10.

This conventional slide bearing assembly requires a plurality of separate slide bearings to stably support the rotary shaft. The number of parts needed is thus rather large, which makes assembling work complicated and manufacturing costs high. The entire assembly tends to be large and bulky.

Another problem of conventional oil-impregnated sintered bearings is their low ability to retain lubricating oil therein. Lubricating oil can easily ooze out of the bearings. Thus, it is necessary to provide an oil seal near each bearing to prevent a magnetic tape from being polluted with lubricating oil. Thus, the rotary shaft has to be sufficiently long so that it can carry such oil seals. This also leads to increased size of the entire assembly.

An object of this invention is to provide a slide bearing assembly which matches or is even better than conventional sintered oil-impregnated bearings in mechanical strength, stability in friction coefficient, and wear resistance, which can be assembled easily, requiring minimum numbers of manufacturing steps and assembling points that need precision work, and which includes a small number of parts, and is small and lightweight.

Another object of the invention is to minimize the number of component parts of a small motor provided with a slide bearing assembly.

SUMMARY OF THE INVENTION

According to the present invention, there is provided a slide bearing formed from a resin composition comprising 20–40% by weight of a synthetic resin, 20–60% by weight of an inorganic filler, 10–30% by weight of a fibrous reinforcing material, 1–7% by weight of a lubricating oil, and 1–5% by weight of an oil retaining material.

There is also provided a slide bearing assembly comprising a slide bearing and a housing for supporting the slide bearing, wherein the slide bearing and the housing are an integral, one-piece member formed from a resin composition comprising 20–40% by weight of a synthetic resin, 20–60% by weight of an inorganic filler, 10–30% by weight of a fibrous reinforcing material, 1–7% by weight of a lubricating oil, and 1–5% by weight of an oil retaining material.

Further, there is provided a small motor comprising a stator, a rotor and the slide bearing assembly. The stator is carried by the housing of the slide bearing assembly, and the rotor has a rotary shaft supported by the slide bearing of the slide bearing assembly.

The invention will be described more in detail.

The synthetic resin used in this invention may be, but is not limited to: polyamide (PA), polyimide (PI), polyamide-imide (PAI), polyphenylene sulfide (PPS), polyacetal (POM), polyether ketone (PEK), polyether-ether ketone (PEEK), aromatic polyester (LCP), and polyolefin resin. It is preferable to use a crystalline thermoplastic resin because it is easily injection-moldable and thus will help simplify manufacturing steps. For higher safety of the final product, the synthetic resin should be a durable, heat-resistant one. Taking all of these factors into account, PPS and POM are the most desirable because they are relatively high in sliding properties and reasonably low in price, and also satisfy all the abovementioned requirements.

The content of the synthetic resin in the entire resin composition should be 20–40% by weight. If less than 20% by weight, pelletizing of the resin composition would be impossible. Such a composition is difficult to handle. If more than 40% by weight, it is difficult to form the resin composition into a desired shape with high dimensional and shape accuracy.

The inorganic filler is added to reduce the rate of molding shrinkage and the anisotropy during molding. It differs from the oil retaining material in its oil absorbing capacity. The inorganic filler used in the invention may be glass flakes, mica, graphite, wollastonite, carbon, or a combination of two or more of them. Good results were obtained when mica and graphite were used separately or in combination.

The content of the inorganic filler in the entire resin composition should preferably be 20–60% by weight. Addition of less than 20% by weight would be insufficient to lower the rate of shrinkage and the anisotropy during molding to a desired degree. Addition of more than 60% by weight would lower the bending modulus, or make it difficult to form the resin composition to a desired shape with sufficiently high dimensional accuracy. Thus, the content of inorganic filler should be more preferably 40–60% by weight.

The fibrous reinforcing material used in this invention is not limited to a specific type as far as it can reinforce the synthetic resin. For example, it may be carbon fiber (CF), glass fiber (GF), aromatic polyamide fiber, alumina fiber, wollastonite, or potassium titanate whiskers. In order to obtain an end product with sufficiently high mechanical strength, the fibrous reinforcing material should have a high tensile modulus of 200 GPa or more.

The content of the fibrous reinforcing material should preferable be more than 10–30% by weight of the entire resin composition. If less than 10% by weight, it can scarcely reinforce the resin composition. If higher than 30% by weight, the weights of the end products, obtained by continuous molding, may vary widely.

The lubricating oil used in this invention is not limited to a specific type, provided it is a liquid lubricant such as a petroleum oil or a synthetic lubricating oil. For example, it may be silicone oil or fatty acid ester oil.

Polymer type lubricants which can be used in the present invention include polyglycols, olefin oligomers, silicone, perfluoroalkylether, perfluoropolyether, chlorofluorocarbons, and polyphenylether. One advantage of such polymer type lubricants is that their viscosity depends upon their molecular weights, so that it is available with a wide range of viscosity.

Polymer type lubricants have average molecular weights of at least 300. If a polymer type lubricant is used, one having an average molecular weight of not less than 1000 is preferable because such a lubricant has a sufficiently high viscosity. One having an average molecular weight of 2000 or higher is more preferable. Its viscosity is preferably about 2 cSt or higher, more preferably about 10 cSt or higher at 100° C. Its viscosity index is preferably about 20 or higher, more preferably about 100 or higher. The polymer type lubricant used in the invention should satisfy at least one of the abovementioned conditions.

Since such a lubricant remains sufficiently viscous while being heated, it is highly improbable that the lubricant may ooze out rather abruptly out of the housing even if frictional heat above 100° C. is produced at the frictional contact portions between the bearings in the housing and the rotary shaft. Rather, the lubricant will be retained in the housing because its viscosity is still fairly high.

The upper limit of its viscosity is not limited. But if a polymer type lubricant is used, its average molecular weight is preferably about 10000 or less, more preferably about 5000 or less for uniform dispersion of oil during pelletization and injection molding. Its viscosity is preferably about 1000 cSt or less, more preferably about 600 cSt, at 40° C. The viscosity at 100° C. is preferably 500 cSt or less, more preferably 100 cSt or less. Its viscosity index is preferably 500 or less, more preferably 300 or less.

A lubricating oil that satisfies the above conditions will remain sufficiently viscous even when heated to a high temperature during pelletizing or injection molding, so that poor dispersion will not occur in the resin composition when the composition is molded into a final shape.

Non-polymer type lubricants which can be used in the invention include alkylbenzene, phosphate ester, polyols esters, diesters, silicate esters, and synthetic naphthenes.

It is also possible to use a phosphate ester oil, a fatty acid ester oil (polyol ester oil), or a water-glycol oil. A phosphate ester oil is highly flame-resistant and wear-resistant. A fatty acid ester oil is passably flame-resistant and is less costly. A water-glycol oil has a passable viscosity. Its viscosity index is high, i.e. 170–210.

The lubricant used in the present invention should have a heat resistance enough to withstand the molding temperature of the resin composition (usually 200°–330° C. though it can reach as high as 400° C. or more). Namely, its exothermic temperature and burning temperature should be higher than the melting point of the thermoplastic resin. Table 1 shows typical thermal properties, i.e. exothermic and burning properties of the lubricants used and their viscosity characteristics.

The silicone oil shown in Table 1 is a polymer type synthetic lubricating oil having a main chain of Si—O—Si. Since the viscosity of polymer type lubricants depends upon their molecular weights, it is possible to determine the viscosity of the lubricant in the resin composition within a wide range by selecting a lubricant having a suitable molecular weight. Due to their molecular structure, these lubricants are less likely to be oxidized. Namely, they have excellent oxidative stability and heat resistance. By incorporating phenyl groups into their molecules, it is possible to further improve their oxidative stability.

Lubricants not listed in Table 1 which can be used in this invention include trifluoropropylmethylsilicone (exothermic temperature: 233° C., burning temperature: 313° C.), and alkylmethylsilicone (exothermic temperature: 192° C., burning temperature: 249° C.).

By using a lubricant having a suitable viscosity, it is possible to prevent it from oozing out of the housing prematurely and abruptly and thus to prevent lubricant from adhering to a magnetic tape. Also, such a lubricant can sufficiently lubricate the bearings for a long period of time because it scarcely flows out, evaporates or dries. Also, such a lubricant can disperse very uniformly in the resin composition.

One of the abovementioned lubricants may be used in the resin composition of the invention, or two or more of them may be used in combination with the hope that the respective lubricants exhibit their inherent properties. If two of them are used in combination, they should be mixed in the ratio of 1:1 to 1:10 (in weight percentage).

The above-listed lubricants are desirable in viscosity and price. The content of the lubricant should be 1–7% by weight of the entire resin composition, preferably 3–5% by weight.

If less than 1% by weight, the lubricity of the resin composition will be insufficient. If more than 7% by weight, the lubricant may produce a large mount of gas during molding, may ooze out of the end product in a large amount, thereby polluting the surroundings, or may make it difficult to form the end product with high dimensional accuracy.

The oil retaining material present in an amount of 1–5% by weight retains the lubricant to allow it to Ooze out at a predetermined rate.

The oil retaining material used in this invention may be an inorganic compound, especially a porous one, and should be capable of retaining or absorbing oil in a large amount because its specific surface area is especially large. In order to retain a sufficient amount of the abovementioned lubricant in its pores, its porosity should be in the range of 20–80% by volume, preferably 40–60% by volume.

Such oil retaining material may be talc, clay, calcium carbonate, carbon or activated carbon.

The content of the oil retaining material should be 1–5% by weight. If less than 1% by weight, it is impossible to sufficiently retain the lubricant, so that the lubricant would separate from the resin composition when pelletizing it. If more than 5% by weight, the lubricant would not ooze out at a desired rate.

A molding filled with such an inorganic compound as mica is fairly vibration-proof when used as a bearing. Thus, by forming a bearing assembly for use in a VTR to feed magnetic tapes from this material, it is possible to reduce vibrations or shifting of tapes, and thus to reduce flutterings of sounds and pictures produced by a recorder/player.

There is a correlation between such vibrations and bending modulus (kgf/mm2). Vibrations can be minimized by setting the bending modulus in the range described in the following Examples. Namely, the bearing assembly should have a bending modulus large enough to be capable of withstanding the force that acts on the bearing assembly in a complicated manner due to the tension in a tape and the pressing force applied through the rubber roller to the rotary shaft. Also, it is important that the bearing assembly be capable of absorbing vibrations produced by these forces or vibrations produced from other moving parts, or otherwise attenuating such vibrations by e.g. moving the resonance point. The bearing and bearing assembly according to this invention can reduce these vibrations.

The abovementioned materials may be mixed together in any well-known method to integrally mold a slide bearing and a housing.

Namely, the synthetic resin and the other materials may be mixed together in such a mixer as a Henschel mixer, a ball mill or a tumbler mixer. The materials thus mixed together may be supplied into an injection molder which has a good melt-blending property, or melt-blended beforehand with heat rollers, a kneader, a Bambury mixer or a melt-extruder.

The mixture thus obtained may be formed or molded into a desired shape by compression molding, extrusion molding or injection molding according to the physical properties of the composition.

The slide bearing assembly according to this invention comprises slide bearings and a housing supporting the slide bearings which are integrally molded from a resin composition. Thus, this bearing assembly is made up of a small number of parts. By selecting the materials forming the composition, it is possible to set the mechanical strength of the housing and the bearings to a predetermined value. Its bearing portions have a stable friction coefficient and allows the lubricant to ooze out stably. The wear resistance is sufficiently high, too.

Thus, the lubricant in the slide bearings will not soil a magnetic tape because it never leaks onto the surface of the rotary shaft. This eliminates the need for oil seals, so that it is possible to use a shorter rotary shaft and thus a smaller motor.

The small motor having this slide bearing assembly can rotate stably because the bearings stabilize its torque and the amount of wear. The motor can be manufactured from a small number of parts.

Other features and objects of the present invention will become apparent from the following description made with reference to the accompanying drawings, in which:

DETAILED DESCRIPTION OF THE PREFERRED EMBODIMENT

The raw materials used in forming the slide bearing assemblies of Examples of the present invention and Comparative Examples are shown below. The numbers attached to the respective raw materials coincide with those in Tables 1 and 2. The contents of the materials are all in weight percent.

(synthetic resin)

(1) polyphenylene sulfide (PPS)
    PPS-T4 by TORPLEN
(2) polyacetal (POM)
    DURACON M90-02 by Polyplastics (inorganic filler)

(3) mica
    Phlogopite mica by Canada MICA
(4) graphite
    Artificial graphite KS10 by LONZA (fibrous filler)

(5) carbon fiber (CF)
    BESFIGHT HM by Toho Rayon, average fiber diameter: 7 μm
    average fiber length: 6 mm (lubricating oil)

(6) silicone oil
    KF96 made by Shinetsu Chemical
(7) fatty acid ester oil
    NISSAN UNISTER-H made by NIHON YUSHI (oil retaining material)

(8) talc
    made by Matsumura SANGYO
(9) clay
    Hard Top Clay made by Shiraishi KOGYO
(10) carbon
    Denka black by DENKI KAGAKU KOGYO
(11) activated carbon
    ADOL-A10 by Osaka Gas Chemical
(12) calcium carbonate
    KARUMOSU by Shiraishi KOGYO

EXAMPLES 1-5, COMPARATIVE EXAMPLES 1-7

The raw materials were supplied into a Henschel mixer at the rates shown in Tables 2 and 3 and sufficiently mixed together. The mixture thus obtained were supplied into a twin-screw melt extruder to extrude and pelletize it. The pellets obtained were supplied into an injection molder to form the slide bearing assembly shown in FIG. 1 by injection-molding the pellets in a predetermined mold.

Figure 1:
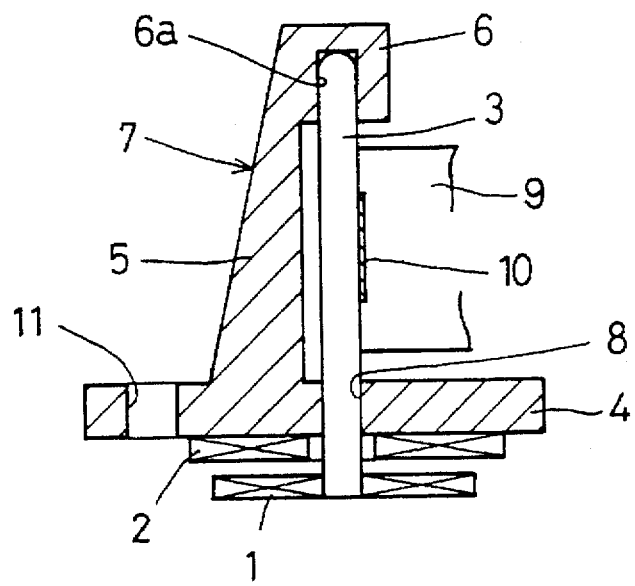
FIG. 1 is a sectional view of a first embodiment of the present invention.

The slide bearing assembly shown in FIG. 1 comprises a housing 7 rotatably supporting a rotary shaft 3 (3 mm in diameter) of a small electric motor comprising a rotor 1 and a stator 2 and comprising a base 4 and a leg 5 uprising from the base 4 and having a cap-shaped top end 6. The rotary shaft 3 has its lower portion rotatably inserted through a hole 8 formed in the base 4 and its top end rotatably received in a round hole 6a formed in the inner surface of the top end 6. In the figure, numeral 9 indicates a rubber roller, 10 a magnetic tape, and 11 a mounting hole. In this arrangement, the slide bearings supporting both ends of the rotary shaft 3 are integral with the housing 7.

The rotor 1 and the rotary shaft 3 may be coupled together in any desired manner. But preferably, the rotary shaft is fitted in the rotor with an interference or negative gap, because with this method, they can be coupled together without using any extra coupling members. This in turn makes it possible to reduce the axial length of the bearing assembly to five times the width of the tape. Such a bearing assembly is compact and lightweight.

Figure 2:
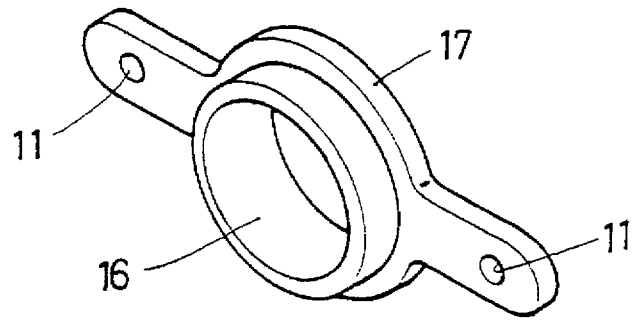
FIG. 2 is a perspective view of a second embodiment of the present invention.

The slide bearing shown in FIG. 2 is a separate member from the housing and is adapted to be fitted in the housing. It comprises a bearing body 16 and an integral bracket 17 with holes 11 for mounting the bearing on a separate member.

Figure 3:
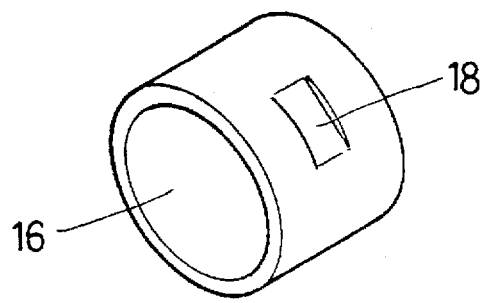
FIG. 3 is a perspective view of a third embodiment of the present invention.

The slide bearing shown in FIG. 3 comprises a bearing body 16 having a mounting groove 18 on its outer periphery. The shape of the bearing is not limited to those shown. It may have any other known shape.

We measured the torque (gf-mm) of bearing assemblies of the type shown in FIG. 1 before and after a 200-hour test in which the assemblies were operated at 2000 rpm while applying a radial load of 100 gf at room temperature. After the test, the degree of wear was also evaluated in four stages: very little wear (⊚); a little wear (o); fairly large degree of wear (Δ); and very large degree of wear (X). Test pieces formed from the same materials as the housings of the above assemblies were tested for their initial dynamic friction coefficient and bending modulus. The results are shown in Table 2.

COMPARATIVE EXAMPLE

Figure 4:
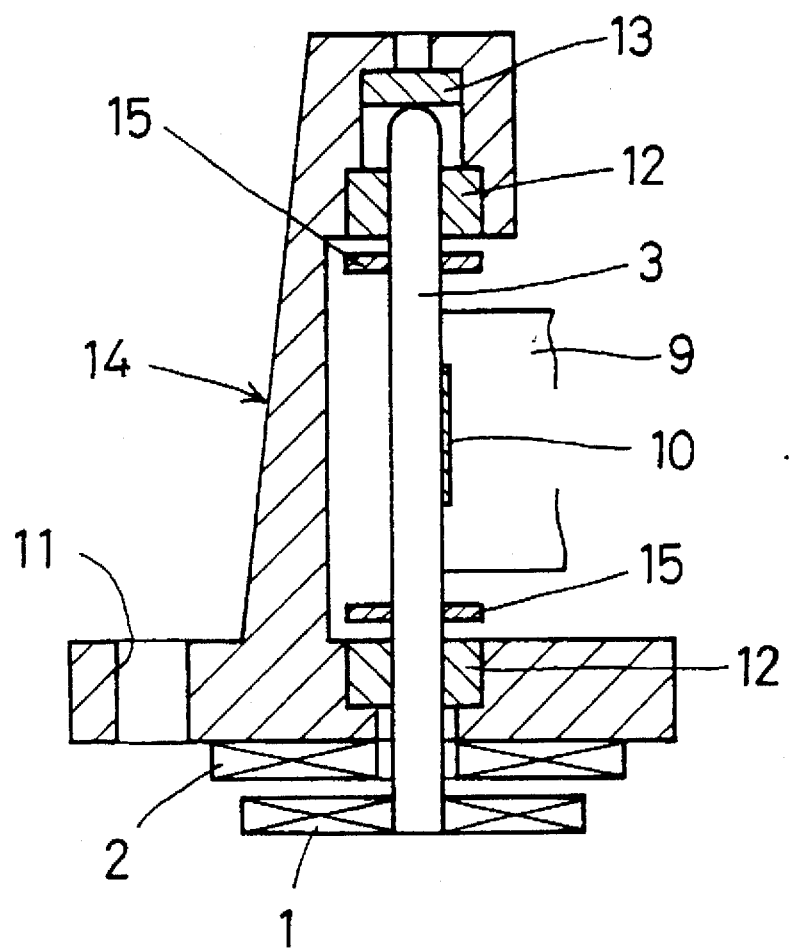
FIG. 4 is a sectional view of the prior art.

For the above-mentioned slide bearing assembly shown in FIG. 4, the torque was measured and the degree of wear was evaluated in the same conditions as with EXAMPLE 1 while dripping oil onto the oil-impregnated sintered bearing 12. The initial dynamic friction coefficient of the oil impregnated sintered bearing and the bending modulus of aluminum alloy of which the housing was made are indicated in Table 3.

As will be apparent from the results in Tables 2 and 3, Comparative Example 1, in which the content of synthetic resin was lower than the defined range, was not moldable. For Comparative Example 2, whose synthetic resin content was higher than the defined range, the initial torque was excessive and unstable. For Comparative Example 3, which contained an excessive amount of inorganic filler, the torque was too large for use as a bearing. For Comparative Example 4, in which the content of inorganic filler was lower than the defined range, the shape of the housing was too unstable to measure the torque. For Comparative Example 5 containing no oil retaining material, both torque and initial dynamic friction coefficient were too large. The degree Of wear of the bearing was also rather large.

In contrast, Examples 1–5 of the present invention, which are formed from resin compositions that satisfy all the defined conditions, were comparable in their various characteristics to conventional slide bearing assemblies comprising an aluminum housing and sintered oil-impregnated bearings mounted in the housing. Moreover, the slide bearing assembly according to the invention, whose bearings are integral with the housing and which requires no seal rings, can be manufactured from a far smaller number of parts and thus can be assembled far more easily than conventional such bearing assemblies.

As one can easily recognize by comparing FIGS. 1 and 4, the bearing assembly of the embodiment requires neither the seal rings that have to be fitted on the rotary shaft 3 supported in the housing 7 of the assembly of FIG. 4 nor the pivot bearing for supporting the rotary shaft. Thus, it is possible to use a shorter rotary shaft. Such a bearing assembly is especially suited for use with a miniature motor used in a small VTR camera or a handy magnetic recording tape recorder to drive narrow magnetic tapes having a width of e.g. ½ inch (1.27 cm) or less, 8 mm or less, 6 mm or less, or 4 mm or less.

According to the present invention, the slide bearing assembly comprising slide bearings for supporting a rotary shaft and a housing for the bearings is an integral member formed from a resin composition. Thus, it can be formed from a far smaller number of parts than conventional bearing assemblies having sintered oil-impregnated bearings while maintaining mechanical strength, stability of friction coefficient and wear resistance that are comparable to or even better than conventional sintered oil-impregnated bearings.

Since no oil seals are needed, it is possible to use a shorter rotary shaft, which leads to further reduction in size of the bearing assembly. It is possible to minimize the numbers of manufacturing steps and assembling points that need precision work. Also, the entire bearing assembly is small and lightweight.

The miniature motor equipped with this slide bearing assembly for supporting its rotary shaft is also small in the number of parts and compact.

TABLE 1

| Kind of silicone oil | Average molecular weight | Viscosity at 40° C. (cSt) | Viscosity at 100° C. (cSt) | Viscosity index | Exothermic temperature (°C.) | Combustion temperature (°C.) |
| --- | --- | --- | --- | --- | --- | --- |
| Dimethyl series | — | 37.5 | 15.5 | 426 | 262 | 312 |
| Dimethyl series | 5000 | 76.4 | 32.8 | 432 | 262 | 312 |
| Dimethyl series | 17000 | 831.5 | 447.4 | 557 | 262 | 312 |
| Phenyl methyl series | | | | | | |
| Phenyl group 5% | — | 36.3 | 13.3 | 381 | 292 | 337 |
| Phenyl group 5% | — | 368.1 | 172.2 | 480 | 292 | 337 |
| Phenyl group 25% | — | 78.4 | 19.6 | 274 | 330 | 405 |
| Phenyl group 50% | 2600 | 244 | 34.1 | 199 | 340 | 422 |
| Fluoro series | — | 184.2 | 27.2 | 220 | — | — |
| Fluoro series | — | 560.1 | 66.4 | 210 | — | — |

TABLE 2

| Material | | Number | Example 1 | 2 | 3 | 4 | 5 |
|---|---|---|---|---|---|---|---|
| Composition (wt %) | | | | | | | |
| Resin | PPS | (1) | 20 | 30 | 40 | — | — |
|  | POM | (2) | — | — | — | 40 | 35 |
| * | Mica | (3) | 54 | 45 | 20 | — | 20 |
|  | Graphite | (4) | — | — | — | 40 | 20 |
| ** | CF | (5) | 20 | 20 | 30 | 10 | 15 |
| Lubricating oil | Silicone oil | (6) | 5 | — | — | 7 | — |
|  | Fatty ester oil | (7) | — | 3 | 5 | — | 5 |
| Oil retaining material | Talc | (8) | — | 2 | — | — | 5 |
|  | Clay | (9) | — | — | 3 | — | — |
|  | Carbon | (10) | 1 | — | — | — | — |
|  | Activated Carbon | (11) | — | — | 2 | — | — |
|  | Calcium carbonate | (12) | — | — | — | 3 | — |
| Initial friction coefficient | | | 0.15 | 0.16 | 0.18 | 0.16 | 0.17 |
| Bending modulus (kgf/mm$^2$) | | | 4000 | 3300 | 3400 | 1600 | 2000 |
| Rotation torque (gf-mm) | | | | | | | |
| Initial | | | 27.8 | 30.5 | 28.9 | 25.5 | 29.0 |
| After 200 hours | | | 29.2 | 25.7 | 24.5 | 26.9 | 30.2 |
| Oil content of molding (wt %) | | | 2.1 | 1.9 | 3.6 | 3.7 | 3.0 |
| Degree of wear of bearing | | | ○ | ◎ | ◎ | ○ | ○ |

*Inorganic filler
**Fibrous reinforcing material

TABLE 3

| Material | | Number | Comparative Example 1 | 2 | 3 | 4 | 5 | 6 | 7 | 8 |
|---|---|---|---|---|---|---|---|---|---|---|
| Composition (wt %) | | | | | | | | | | |
| Resin | PPS | (1) | 12 | 65 | 20 | 43 | 45 | 30 | 70 | — |
|  | POM | (2) | — | — | — | — | — | — | — | — |
| Filler | Mica | (3) | 55 | 20 | 65 | 12 | 37 | 50 | — | — |
|  | Graphite | (4) | — | — | — | — | — | — | — | — |
| * | CF | (5) | 25 | 10 | 10 | 33 | 15 | 20 | 30 | — |
| Lubricating oil | Silicone oil | (6) | — | — | — | — | — | — | — | — |
|  | Fatty ester oil | (7) | 4 | 3 | 4 | 7 | 3 | — | — | dripped |
| Oil retaining material | Talc | (8) | — | 2 | 1 | — | — | — | — | — |
|  | Clay | (9) | 4 | — | — | 5 | — | — | — | — |
|  | Carbon | (10) | — | — | — | — | — | — | — | — |
|  | Activated Carbon | (11) | — | — | — | — | — | — | — | — |
|  | Calcium carbonate | (12) | — | — | — | — | — | — | — | — |
| Initial friction coefficient | | | **— | 0.24 | 0.22 | 0.24 | 0.30 | 0.28 | 0.16 | 0.05~1 |
| Bending modulus (kgf/mm$^2$) | | | **— | 2800 | 3000 | 2800 | 2600 | 3500 | 1000 | 2700 |
| Rotation torque (gf-mm) | | | | | | | | | | |
| Initial | | | **— | 45~52 | 41.1 | Unstable | 50< | 50< | Unstable | 22.8 |
| After 200 hours | | | **— | 42.3 | 40.6 | — | Not rotate | — | — | 25.3 |
| Oil content of molding (wt %) | | | **— | 1.6 | 1.7 | 4.0 | 0.1 | — | — | — |
| Degree of wear of bearing | | | **— | x | Δ | — | x | x | — | ◎ |

*Fibrous reinforcing material
**Unmeasurable as it is not moldable

What is claimed is:

1. A slide bearing consisting essentially of a resin composition comprising 20–40% by weight of a synthetic resin, 20–60% by weight of an inorganic filler, 10–30% by weight of a fibrous reinforcing material, 1–7% by weight of a lubricating oil, and 1–5% by weight of an oil retaining material.

2. A slide bearing assembly comprising:
a slide bearing; and
a housing supporting said slide bearing, wherein said slide bearing and said housing are an integrally formed, one-piece member formed solely of a resin composition comprising 20–40% by weight of a synthetic resin, 20–60% by weight of an inorganic filler, 10–30% by weight of a fibrous reinforcing material, 1–7% by weight of a lubricating oil, and 1–5% by weight of an oil retaining material.

3. A slide bearing assembly as claimed in claim 2, wherein said synthetic resin is one selected from the group consisting of polyphenylene sulfide and polyacetal.

4. A slide bearing assembly as claimed in claim 2, wherein said inorganic filler is at least one selected from the group consisting of kaolin, mica and graphite.

5. A slide bearing assembly as claimed in claim 2, wherein said fibrous reinforcing material has a tensile modulus of not less than 200 GPa.

6. A slide bearing assembly as claimed in claim 2, wherein said lubricating oil is one selected from the group consisting of a silicone oil and a fatty acid ester oil.

7. A slide bearing assembly as claimed in claim 2, wherein said oil retaining material is at least one selected from the group consisting of talc, clay, carbon, activated carbon, and calcium carbonate.

8. A slide bearing assembly as claimed in claim 3 wherein said inorganic filler is at least one selected from the group consisting of kaolin, mica and graphite.

9. A slide bearing assembly as claimed in claim 3 wherein said fibrous reinforcing material has a tensile modulus of not less than 200 GPa.

10. A slide bearing assembly as claimed in claim 4 wherein said fibrous reinforcing material has a tensile modulus of not less than 200 GPa.

11. A slide bearing assembly as claimed in claim 8 wherein said fibrous reinforcing material has a tensile modulus of not less than 200 GPa.

12. A small motor comprising:

a slide bearing assembly including a slide bearing and a housing supporting said slide bearing, wherein said slide bearing and said housing are an integrally formed, one-piece member formed of a resin composition comprising 20–40% by weight of a synthetic resin, 20–60% by weight of an inorganic filler, 10–30% by weight of a fibrous reinforcing material, 1–7% by weight of a lubricating oil, and 1–5% by weight of an oil retaining material, a stator carried by said housing of said slide bearing assembly; and a rotor having a rotary shaft supported by said slide bearing assembly.

13. A small motor as claimed in claim 12, wherein said synthetic resin is one selected from the group consisting of polyphenylene sulfide and polyacetal.

14. A small motor as claimed in claim 12, wherein said inorganic filler is at least one selected from the group consisting of kaolin, mica and graphite.

15. A small motor as claimed in claim 12, wherein said fibrous reinforcing material has a tensile modulus of not less than 200 GPa.

16. A small motor as claimed in claim 12, wherein said lubricating oil is one selected from the group consisting of a silicone oil and a fatty acid ester oil.

17. A small motor as claimed in claim 12, wherein said oil retaining material is at least one selected from the group consisting of talc, clay, carbon, activated carbon, and calcium carbonate.

* * * * *